May 25, 1948. H. E. PAGE 2,442,057
HYDRAULIC PRESSURE MULTIPLYING SYSTEM
Filed Jan. 31, 1944 2 Sheets-Sheet 1

INVENTOR.
Herbert E. Page
BY
Atty.

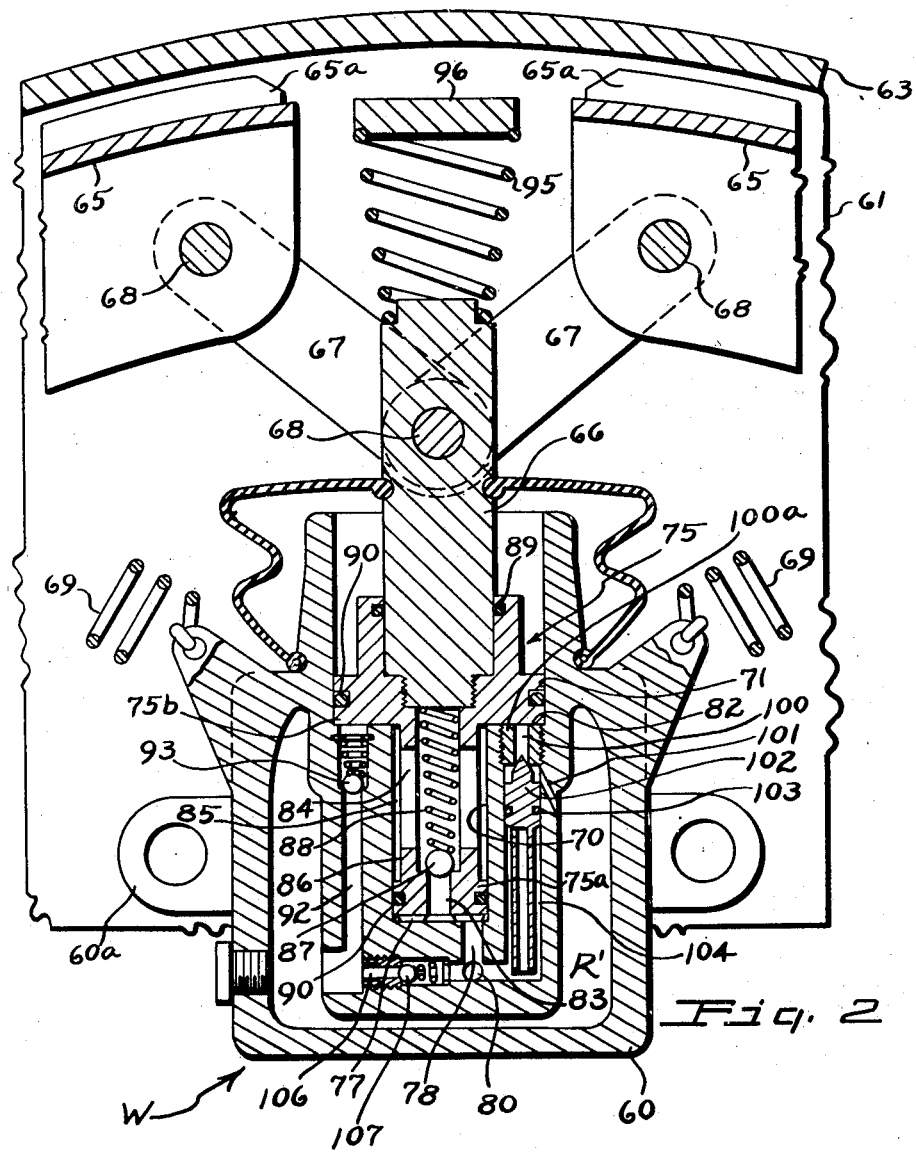

Patented May 25, 1948

2,442,057

UNITED STATES PATENT OFFICE 2,442,057

HYDRAULIC PRESSURE MULTIPLYING SYSTEM

Herbert E. Page, Pasadena, Calif.

Application January 31, 1944, Serial No. 520,411

7 Claims. (Cl. 60—54.6)

This invention has to do with hydraulic pressure multiplying apparatus and relates more particularly to main hydraulic fluid supply units or cylinders for use in hydraulic systems.

For instance, in hydraulic braking systems it has long been an aim of those working in the art to accomplish, with a given movement of the braking pedal, a relatively rapid movement of the braking shoe into initial contact with the drum and then to automatically convert the fluid pressure into braking applying force at a relatively higher ratio. In my copending application Serial No. 516,762, filed January 3, 1944, I show a new type of braking unit for installation in the brake drums, which accomplishes this end regardless of the type of master cylinder used.

My present invention has for one of its aims the provision of a master cylinder or main hydraulic fluid supply unit which may be substituted for conventional master cylinders and thus convert a conventional braking system into one in which the pressure application is made in at least two stages and wherein the pressure application is automatically converted from a low pressure high volume initial stage (to initially move the brake shoes into contact with the drums) to a high pressure low volume stage to accomplish the application of braking pressure at a higher ratio.

I have also found that my master cylinder, when used in combination with braking elements mounted in the wheel drums of the character shown in my said copending application, produces a braking system affording tremendous advantages, and it is therefore one of my objects to provide a master cylinder utilizing such multistage application of pressure in combination with multi-stage pressure applying units mounted in the brake drums.

Still further objects and advantages are inherent in my invention and how those as well as the objects hereinabove pointed out are achieved will be best understood from the following description. While in the following specification I shall describe in detail one of the physical forms which my invention may take, I wish it understood that the invention, in its broader aspects, is not to be limited to such described details. In the accompanying drawings, which form a part hereof:

Fig. 2 is a fragmentary medial section of a wheel braking unit.

Figure 1:
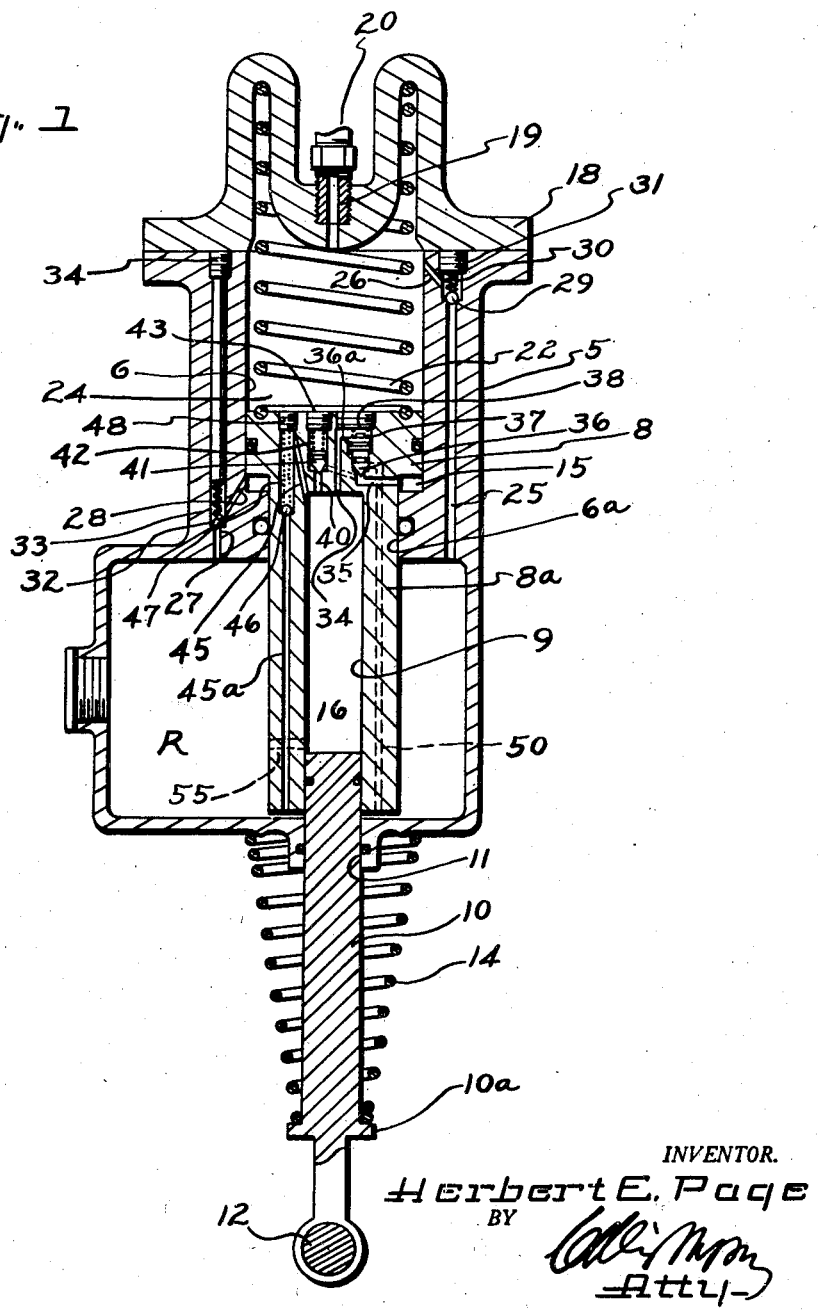
Fig. 1 is a longitudinal sectional view of my improved master cylinder.

Referring to the drawings, I show at 5 a body providing a fluid reservoir R and a cylinder 6 separated from the reservoir by a reduced diameter portion 6a.

A piston 8 reciprocates in cylinder 6 and has a reduced diameter portion 8a reciprocating through the reduced cylinder portion 6a. The piston has a longitudinal bore 9 in which a piston 10 reciprocates, piston 10 passing through an opening 11 in the body and being urged outwardly by a spring 14 bearing at one end against the body and at its other end against an annular flange 10a on the piston. A rod 12 carried by the outer end of the piston 10 is adapted to operatively connect the piston to a conventional brake pedal, not shown.

Piston 8 provides, with the inner end portion of the cylinder 6, a pressure chamber 15 and the bore 9 provides a pressure chamber 16.

The outer end of cylinder 6 is closed by a cap 18 which has an outlet port 19 adapted to be connected to the braking units in the wheel drums, as by a tube 20. A wheel braking unit W is shown in Fig. 2. A spring 22, seating at one end against the piston 8 and at its other end in a recess in cap 18, normally urges the piston rearwardly in the cylinder. A fluid chamber 24 is provided by the outer end of the piston 8, cylinder 6 and end cap 18.

The body is provided with fluid passageways 25, 26, 27, 28, the purpose of which will appear hereinafter. Passage 25 is controlled by a ball check valve 29 seating towards the reservoir and urged against its seat by a spring 30 which bears at its other end against a threaded adjusting plug 31. Passage 27 is controlled by a ball check valve 32 seating towards the reservoir R and is urged against its seat by a spring 33 which bears at its other end against a threaded adjusting plug 34.

Piston 8 has port 35 providing communication from chamber 15 to reservoir via a port 59, a poppet 36, having seal ring 36a, controlling said communication, being normally urged against its seat (towards chamber 15) by a spring 37 bearing at its outer end against adjusting plug 38. The rearward end of poppet 36 is exposed to pressure in chamber 16 through a port 34. A port 40 in piston 8 provides communication between chambers 16 and 15 in the opposite direction, being controlled by a poppet 41 seating towards chamber 16 and normally urged seated by a spring 42 which bears at its other end against a threaded adjusting plug 43 and is yieldable to predetermined pressure in chamber 16.

A port 45 in piston 8 provides communication between reservoir R and chamber 16 via a port 45a in piston portion 8a, said ports being controlled by a ball check valve 46 seating towards the reservoir and normally urged against its seat by a spring 47 which bears at its other end against a threaded adjusting plug 48. A port 50 in piston portions 8, 8a provides communication between chamber 15 and reservoir R, being controlled by poppet valve 36.

Important advantages are to be derived from the use of the master cylinder hereinabove described in combination with a wheel cylinder such, for instance, as shown in Fig. 2, which wheel cylinder per se is more particularly described and claimed in my above-mentioned co-pending application.

In Fig. 2 I show a wheel braking unit W comprising a body 60 secured to a backing plate 61 of a brake drum 63. The backing plate may be secured to the axle housing in conventional manner, while the drum 63 is secured to the wheel to be braked.

Brake shoes 65 are mounted in the drum and swingably secured to the backing plate. The free ends of the shoes are pivotally connected to the connecting rod 66 of the hydraulic unit by links 67 and pins 68. The opposite ends of the shoes are pivotally secured to the backing plate by a pivot pin, not shown, and their free ends are normally urged together by retractile springs 69, which springs are secured at one end to the respective shoes and at their other ends to the body 60. The body has attaching flanges 60a by which they are secured to the backing plate.

Body 60 provides a hydraulic fluid reservoir R' and cylinders 70, 71. A piston 75 has a smaller diameter inner end portion 75a reciprocally mounted in cylinder 70 and a larger diameter outer end portion 75b reciprocally mounted in cylinder 71. The inner end of piston 75a forms with the inner end of cylinder 70 a pressure chamber 77 which communicates with fluid chamber 24 of the master cylinder through a port 78 and port 80, which latter port is in communication with the fluid chamber 24 by a tube 20.

The relatively large diameter portion 75b forms with the inner end of cylinder 71 a pressure chamber 82 which communicates with chamber 77 through a longitudinal bore 83, radial slots 84, in piston 75a, and an annular chamber 85 provided by the reduced diameter portion 86 of piston 75a.

A ball check valve 87 seats towards chamber 77 in bore 83, being yieldably urged against its seat by a spring 88, which spring bears at its other end against the inner end of rod 66, said rod being threaded into a recess in the end of the piston and being provided with a seal ring 89. The piston is also provided with seal rings 90. Spring 88 is of a strength sufficient to maintain ball 87 on its seat against pressure in chamber 77 until the piston is moved outwardly to initially contact the lining 65a of the shoes 65 with the drum, at which time the spring will yield to pressure in chamber 77 to pass fluid from that chamber into chamber 82 to apply the braking pressure at a different volume-pressure ratio.

During the initial movement of the piston to initially move the shoe linings into braking contact with the drum, during which movement a vacuum will be created in chamber 82, make-up fluid is drawn into that chamber from the reservoir through a port 92 which is controlled by a spring-pressed ball check valve 93 seating towards the reservoir.

Upon release of the fluid pressure in fluid chamber 24 of the master cylinder the springs 69 and a spring 95, which bears at one end against a projection 96 on the backing plate and at its other end against the outer end of rod 66, will move the shoes away from the drum and will force the piston 75 inwardly. During this movement, fluid in chamber 82 is returned to the reservoir through a port 100 provided by sleeve 100a and body port 101. During the braking pressure, port 100 is maintained closed by a poppet valve 102 carrying a seal ring 103 and reciprocally disposed in a pressure chamber 104, which chamber 104 is in communication with the fluid chamber 24 of the master cylinder so that the poppet 102 is maintained seated by fluid pressure. Thus, when the fluid pressure in chamber 24 is relieved, poppet 102 may be readily unseated by pressure in chamber 82. Any excess fluid in reservoir R' may be returned to chamber 24 when piston 75 is retracted, by passing from the reservoir through a port 106, past spring-pressed check valve 107, which valve seats towards the reservoir, and thence outwardly through port 80.

Operation of the system is as follows: Initial pressure on the conventional braking pedal moves piston 10 inwardly of bore 9, and spring 42 being sufficiently strong to maintain poppet 41 seated when there is no substantial resistance to movement of piston 8 into the fluid chamber 24, said piston 8 will move into fluid chamber 24 relatively rapidly and thus force fluid through tube 20 into chamber 77 of the wheel braking unit, which in turn relatively rapidly moves piston 75 outwardly to initially establish contact of the shoe linings with the drum. During this initial movement of piston 8, make-up fluid is drawn into chamber 15 through port 27 and past poppet 32. After initial contact of the shoes with the drums is thus established, the spring-pressed poppet 41 will yield to pressure in chamber 16 and fluid under pressure will be passed into chamber 15. This pressure also acts against the bottom of poppet 36 and, in conjunction with the spring 37, maintains poppet 36 seated against pressure in chamber 15. Thus the braking pressure may be applied not only through a more favorable volume-pressure ratio in the master cylinder by virtue of the relatively larger piston area exposed to chamber 15 than the area exposed to chamber 16, but also in the wheel braking unit W by virtue of the relatively larger piston area exposed to chamber 82 than the piston area exposed to chamber 77.

Release of pressure on the foot pedal permits spring 14 to move piston 10 outwardly of chamber 16 and spring 22 returns piston 8 to its starting position shown in the drawings. During this operation the fluid in chamber 15 is returned to the reservoir through port 50, past poppet 36. Any depletion of the fluid within the fluid chamber 24 and the wheel unit W may be made up by fluid being drawn from the reservoir R through port 25.

So that there may not occur any pressure lock in chamber 16 preventing return of piston 8 to starting position, a radial port 55 is provided in piston portion 8a providing communication between chamber 16 immediately in front of piston 10, when the latter is retracted, and reservoir R.

I claim:

1. In a hydraulic braking system, a master fluid pressure supply member comprising: a body providing a fluid reservoir and a cylinder, a piston mounted for reciprocation in the cylinder and having a longitudinal bore providing a primary pressure chamber, the rear pressure-receiving face of the piston forming with the cylinder a main pressure chamber and the opposite face of the piston forming with the cylinder a fluid chamber, spring means yieldably bearing against the piston to urge it rearwardly in the cylinder, a pressure generating piston mounted for reciprocation in the primary chamber to generate fluid pressure therein, a port in the piston providing communication from the primary to the main chamber, valve means controlling said port, said valve being yieldable to predetermined pressure in the primary chamber to pass fluid to the main chamber, a fluid passageway in the body providing communication from the reservoir to the main chamber, valve means controlling said fluid passageway, said valve means being yieldable to vacuum in the main chamber, and means responsive to pressure on the piston by the spring means when the primary chamber is not under pressure to pass fluid from the main chamber to the reservoir.

2. In a hydraulic braking system, a master fluid pressure supply member comprising: a body providing a fluid reservoir and a cylinder, a piston mounted for reciprocation in the cylinder and having a longitudinal bore providing a primary pressure chamber, the rear pressure-receiving face of the piston forming with the cylinder a main pressure chamber and the opposite face of the piston forming with the cylinder a fluid chamber, spring means yieldably bearing against the piston to urge it rearwardly in the cylinder, a pressure generating piston mounted for reciprocation in the primary chamber to generate fluid pressure therein, a port in the piston providing communication from the primary to the main chamber, valve means controlling said port, said valve being yieldable to predetermined pressure in the primary chamber to pass fluid to the main chamber, a fluid passageway in the body providing communication from the reservoir to the main chamber, valve means controlling said fluid passageway, said valve means being yieldable to vacuum in the main chamber, and means responsive to pressure on the piston by the spring means when the primary chamber is not under pressure to pass fluid from the main chamber, said means comprising a fluid-passing port in the piston providing communication from the main chamber to the reservoir, a poppet valve in said port seating towards the main chamber, said poppet being yieldable to open the fluid-passing port in response to pressure exerted on the piston by said spring means when pressure is relieved in the primary chamber, and means for communicating fluid pressure generated in the primary chamber to the rear face of the poppet.

3. In a hydraulic braking system, a master fluid pressure supply member comprising: a body providing a fluid reservoir and a cylinder, a piston mounted for reciprocation in the cylinder and having a longitudinal bore providing a primary pressure chamber, the rear pressure-receiving face of the piston forming with the cylinder a main pressure chamber and the opposite face of the piston forming with the cylinder a fluid chamber, spring means yieldably bearing against the piston to urge it rearwardly in the cylinder, a pressure-generating piston mounted for reciprocation in the primary chamber to generate fluid pressure therein, a port in the piston providing communication from the primary to the main chamber, valve means controlling said port, said valve being yieldable to predetermined pressure in the primary chamber to pass fluid to the main chamber, a fluid passageway in the body providing communication from the reservoir to the main chamber, valve means controlling said fluid passageway, said valve means being yieldable to vacuum in the main chamber, means responsive to pressure on the piston by the spring means when the primary chamber is not under pressure to pass fluid from the main chamber, said means comprising a fluid-passing port in the piston providing communication from the main chamber to the reservoir, a poppet valve in said port seating towards the main chamber, said poppet being yieldable to open the fluid-passing port in response to pressure exerted on the piston by said spring means when pressure is relieved in the primary chamber, means for communicating fluid pressure generated in the primary chamber to the rear face of the poppet, a passageway in the body providing communication from the reservoir to the fluid chamber, and a valve controlling said passageway, said last-named valve being yieldable to open the passageway in response to vacuum in the fluid chamber.

4. In a hydraulic braking system, a master fluid pressure supply member comprising: a body providing a fluid reservoir and a cylinder, a piston mounted for reciprocation in the cylinder and having a longitudinal bore providing a primary pressure chamber, the rear pressure-receiving face of the piston forming with the cylinder a main pressure chamber and the opposite face of the piston forming with the cylinder a fluid chamber, spring means yieldably bearing against the piston to urge it rearwardly in the cylinder, a pressure-generating piston mounted for reciprocation in the primary chamber to generate fluid pressure therein, a port in the piston providing communication from the primary to the main chamber, valve means controlling said port, said valve being yieldable to predetermined pressure in the primary chamber to pass fluid to the main chamber, a fluid passageway in the body providing communication from the reservoir to the main chamber, valve means controlling said fluid passageway, said valve means being yieldable to vacuum in the main chamber, means responsive to pressure on the piston by the spring means when the primary chamber is not under pressure to pass fluid from the main chamber, a passageway in the piston providing fluid communication from the reservoir to the primary chamber, and a check valve controlling said last-named passageway, said last-named valve being yieldable to open said passageway in response to vacuum in the primary chamber.

5. In a hydraulic braking system, a master fluid pressure supply member comprising: a body providing a fluid reservoir and a cylinder, a piston mounted for reciprocation in the cylinder and having a longitudinal bore providing a primary pressure chamber, the rear pressure-receiving face of the piston forming with the cylinder a main pressure chamber and the opposite face of the piston forming with the cylinder a fluid chamber, spring means yieldably bearing against the piston to urge it rearwardly in the cylinder, a pressure-generating piston mounted for reciprocation in the primary chamber to generate fluid pressure therein, a port in the piston providing communication from the primary to the main chamber, valve means controlling said port, said valve being yieldable to predetermined pressure in the primary chamber to pass fluid to the main chamber, a fluid passageway in the body providing communication from the reservoir to the main chamber, valve means controlling said fluid passageway, said valve means being yieldable to vacuum in the main chamber, means responsive to pressure on the piston by the spring means when the primary chamber is not under pressure to pass fluid from the main chamber, and spring means yieldably urging the pressure-generating piston outwardly of the primary chamber.

6. In a hydraulic braking system, a master fluid pressure supply member comprising a body having a fluid reservoir and a fluid chamber, a piston having a head portion mounted for reciprocation in the fluid chamber and having a rearward portion extending into the reservoir, a longitudinal bore in the piston opening through the rearward end thereof and providing a primary pressure chamber, a port connecting the primary pressure chamber to the reservoir, a check valve in said port seating towards the reservoir, a spring yieldably urging said check valve seated, said spring being yieldable in response to vacuum in the primary pressure chamber, means providing a main pressure chamber annularly of the rearward portion of the piston and behind the head portion of said piston, a port providing communication between the primary pressure chamber and the main pressure chamber, a check valve in the last-named port seating towards the primary chamber, spring means yieldably urging the last-named valve seated, said last-named spring means being yieldable in response to predetermined pressure in the primary pressure chamber, a passageway in the piston providing communication between the reservoir and the main pressure chamber, a check valve in said passageway seating towards the reservoir, a spring urging the last-named check valve seated and being yieldable in response to vacuum in the main pressure chamber, a pressure release port in the piston providing communication between the main chamber and the reservoir, a check valve in the pressure release port seating towards the main pressure chamber, said last-named check valve being seated in response to fluid pressure in the primary pressure chamber, spring means interposed between the front face of the piston head and the outer end of the fluid chamber and operable to move the piston inwardly of the fluid chamber when pressure is released from the primary pressure chamber, a fluid-passing port in the body communicating with the fluid chamber at a point in front of the piston head, and a passageway in the body providing communication between the reservoir and the fluid chamber at a point spaced outwardly from the front of the cylinder head.

7. In a hydraulic braking system, a master fluid pressure supply member comprising a body having a fluid reservoir and a fluid chamber, a piston having a head portion mounted for reciprocation in the fluid chamber and having a rearward portion extending into the reservoir, a longitudinal bore in the piston opening through the rearward end thereof and providing a primary pressure chamber, a port connecting the primary pressure chamber to the reservoir, a check valve in said port seating towards the reservoir, a spring yieldably urging said check valve seated, said spring being yieldable in response to vacuum in the primary pressure chamber, means providing a main pressure chamber annularly of the rearward portion of the piston and behind the head portion of said piston, a port providing communication between the primary pressure chamber and the main pressure chamber, a check valve in the last-named port seating towards the primary chamber, spring means yieldably urging the last-named valve seated, said last-named spring means being yieldable in response to predetermined pressure in the primary pressure chamber, a passageway in the piston providing communication between the reservoir and the main pressure chamber, a check valve in said passageway seating towards the reservoir, a spring urging the last-named check valve seated and being yieldable in response to vacuum in the main pressure chamber, a pressure release port in the piston providing communication between the main chamber and the reservoir, a check valve in the pressure release port seating towards the main pressure chamber, said last-named check valve being seated in response to fluid pressure in the primary pressure chamber, spring means interposed between the front face of the piston head and the outer end of the fluid chamber and operable to move the piston inwardly of the fluid chamber when pressure is released from the primary pressure chamber, a fluid-passing port in the body communicating with the fluid chamber at a point in front of the piston head, a passageway in the body providing communication between the reservoir and the fluid chamber at a point spaced outwardly from the front of the cylinder head, a check valve in the last-named passageway seating towards the reservoir and a spring yieldably urging the last-named check valve seated, said last-named spring being yieldable in response to vacuum in the fluid chamber.

HERBERT E. PAGE.

REFERENCES CITED

The following references are of record in the file of this patent:

UNITED STATES PATENTS

| Number | Name | Date |
| --- | --- | --- |
| 1,958,722 | Sinclair | May 15, 1934 |
| 2,170,851 | Carroll | Aug. 29, 1939 |
| 2,220,829 | Rouch | Nov. 5, 1940 |
| 2,277,336 | Loweke | Mar. 24, 1942 |
| 2,343,900 | Groves | Mar. 14, 1944 |